United States Patent [19]
Willis

[11] Patent Number: 6,018,347
[45] Date of Patent: Jan. 25, 2000

[54] METHODS AND APPARATUS FOR RENDERING THREE-DIMENSIONAL IMAGES

[75] Inventor: Lee R. Willis, Livermore, Calif.

[73] Assignee: Multigen Paradigm, Inc., San Jose, Calif.

[21] Appl. No.: 08/833,845

[22] Filed: Apr. 10, 1997

Related U.S. Application Data

[60] Provisional application No. 60/015,354, Feb. 12, 1996, and provisional application No. 60/015,389, Feb. 12, 1996.

[51] Int. Cl.[7] .................................................. G06T 15/00
[52] U.S. Cl. .............................................................. 345/419
[58] Field of Search .................................... 345/418, 419, 345/420, 423, 424, 429, 430

[56] References Cited

U.S. PATENT DOCUMENTS

| | | | |
|---|---|---|---|
| 4,615,013 | 9/1986 | Yan et al. ................................. | 364/521 |
| 5,268,996 | 12/1993 | Steiner et al. ........................... | 345/426 |
| 5,367,615 | 11/1994 | Economy et al. ........................ | 345/429 |

OTHER PUBLICATIONS

U.S. Patent Application No. 08/749,285 (unofficial), filed Nov. 13, 1996, "A System and Method for Displaying Different Portions of an Object in Different LOD Levels".

U.S. Provisional Patent Application No. 60/030,681, filed Nov. 13, 1996, "A System and Method for Continuously Transitioning the Display of an Object Between Different Levels-of-Detail".

L. Willis, M. Jones, and J. Zhao, "A Method for Continuous Adaptive Terrain," 1996 Image Conference (1996).

*Primary Examiner*—Phu K. Nguyen
*Assistant Examiner*—Cliff N. Vo
*Attorney, Agent, or Firm*—Beyer & Weaver, LLP

[57] ABSTRACT

A computer-implemented method for modeling a three-dimensional image with polygons having different levels of detail. The method includes initially modeling the three-dimensional image with a first plurality of polygons at a first level of detail. The first level of detail represent the coarsest level of detail available for modeling the three-dimensional image. The first plurality of polygons are provided as part of an input data set. The method further includes comparing a distance between a first polygon of the first plurality of polygons and an eye point to a predefined threshold distance value associated with a level of detail of the first polygon. If the distance is less than the predefined threshold distance value, the method substitutes in a second plurality of polygons for the first polygon. The second plurality of polygons are at a second level of detail higher than the first level of detail and computed in advance prior to a commencement of the initial modeling step and provided as part of the input data set.

25 Claims, 14 Drawing Sheets

| UNIQUE VERTEX ID | NORMAL VALUE |
|---|---|
| • | • |
| • | • |
| • | • |
| 7 | NIL |
| 8 | 0,0,1 |
| 9 | NIL |
| 10 | 1,0,0 |
| • | • |
| • | • |
| • | • |

METHODS AND APPARATUS FOR RENDERING THREE-DIMENSIONAL IMAGES

This application claims priority under 35 U.S.C 119 (e) of a provisional application entitled "Methods and Apparatus for Rendering Three-Dimensional Images" filed Feb. 12, 1996 by inventor Lee R. Willis (U.S. application Ser. No. 60/015,354) and of a provisional application entitled "Methods and Apparatus for Modeling 3-D Objects" filed Feb. 12, 1996 by inventors Lee R. Willis and Jenny Zhao (U.S. application Ser. No. 60/015,389).

BACKGROUND OF THE INVENTION

The present invention relates to methods and apparatus for rendering three-dimensional images on a computer display screen. More specifically, the present invention relates to methods and apparatus for managing the level of detail while rendering the geometry information of three-dimensional images.

Three-dimensional images, such as three-dimensional objects or terrain images, are typically rendered on a computer display screen by projecting a two-dimensional photographic image onto a geometric model. The photographic image furnishes two-dimensional details typically found in a two-dimensional photograph while the geometric model provides the texture and perspective regarding the third dimension. If the three-dimensional image to be rendered represents a terrain map, for example, the two-dimensional image may represent a photograph of the area. The geometric model onto which the two-dimensional image is projected provides the perspective regarding the peaks and valleys of the terrain.

As is widely known in the art, the geometric or perspective information may be modeled by a plurality of polygons, e.g., triangles. In a given image on the computer display screen, the level of detail of a rendered object is directly related to the number of polygons employed to model it. By way of example, FIG. 1A illustrates the rendition of an object 10 of an image 12 at a fairly coarse level of detail. In FIG. 1A, object 10 is modeled by four polygonal faces of which three faces (2, 4, and 6) are shown. In contrast to FIG. 1A, object 10 of FIG. 1B employs a greater number of polygonal faces to model itself and therefore can provide a finer level of detail. Note that in both FIGS. 1A and 1B, the two dimensional photograph that is typically projected onto the geometric model has been omitted for clarity.

While a greater number of polygons generally provides a higher level of detail, the use of a large number of polygons to model a particular image may impose too high a computational load on the computer to permit the computer to adequately model the image at a given frame rate. In rendering the geometry information of 3-dimensional objects, it is therefore important to perform level of detail (LOD) management to balance the appropriate level of detail to be presented to the user and the computational load on the computer itself.

Typically, the management of the LOD is performed as a function of the distance between a particular portion of the image to an eye point. For example, it is recognized that objects within the image that are further away from the eye point can be rendered with less detail, i.e., employing fewer polygons, without significantly affecting the fidelity of the rendered image. As the object moves closer to the eye point, a greater number of polygons may be employed to model that object in greater detail. By way of example, an airplane at the horizon may be represented by two triangles, representing the two wings. As the eye point moves closer to the plane, a greater number of polygons may be required to model the curvature of the wings and other details of the airplane such as the body, the windows, and the like. A well thought-out LOD management approach would reduce the overall number of polygons required to render a three-dimensional image while preserving the apparent fidelity of the rendered image.

In the prior art, management of the levels of detail is performed in a discrete manner. Under this approach, a given object in the image may be represented internally at multiple levels of detail. As the eye point moves toward or away from an object, its polygonal model changes instantaneously to reflect the appropriate level of detail given its distance to the eye point. However, since the change in the levels of detail occurs in a discrete manner, the visual effect is rather abrupt and may be readily noticed by the user as jarring, visually discontinuous motion. In the rendering of a terrain map, for example, users may see a new hill popping up out of the ground instantaneously as they increase its level of detail by moving an eye point toward a seemingly smooth ground portion.

In the prior art, the image to be rendered is modeled initially, i.e., at the start of a frame, by polygons at their coarsest level of detail, i.e., by the base polygons. A set of rules is then provided for subdividing these base polygons into smaller and smaller child polygons to represent portions of the image at finer and finer levels of detail. Under this prior art approach, objects which are closer to the eye point are modeled by a greater number of polygons, which are generated dynamically during run time from the coarser parent polygons.

Although this prior art approach gives the appearance of a continuum in the levels of detail, there are several disadvantages. For example, some virtual reality or simulation product requires a fairly fast frame rate, typically around 30 frames per second. Consequently, the computer only has at most 1/30th of a second to perform its modeling task for a given image. Since the prior art requires that the numerous child polygons, which are employed for modeling the objects close to the eye point, be generated on the fly, a high computational load is imposed on the computer while rendering the image. For images which are, for example, large, complex, or highly detailed, the high computational load imposed by the prior art dynamic approach may require an unduly large amount of time to complete the modeling task. When this happens, time may run out before modeling is completed for a given frame. When this happens, the computer may be forced to either slow the frame rate down to allow the modeling task to be completed or to proceed with rendering the incompletely modeled image in order to keep up the required frame rate. As can be appreciated, either alternative is less than desirable.

In view of the foregoing, what is needed are improved methods and apparatus for managing the levels of detail of objects in the rendition of three-dimensional images on a computer display screen.

SUMMARY OF THE INVENTION

The invention relates, in one embodiment, to a computer-implemented method for managing levels of detail of a first plurality of polygons representative of a portion of an image to be displayed on a computer display terminal. The portion represents a field of view of the image. The levels of detail are determined responsive to predefined display criteria. The method includes loading the first plurality of the polygons into a face queue. The method further includes examining, from a top of the face queue, a first polygon of the first plurality of polygons.

The examination includes placing the first polygon into a display list if the first polygon satisfies the predefined display criteria. The examination further includes substituting a second polygon back into the face queue at a bottom of the face queue if the first polygon fails to satisfy the predefined display criteria. The second polygon represent a child polygon of the first polygon. The second polygon has a higher level of detail than the first polygon. At any given point in time, polygons in the face queue and the display list represent polygons employed to represent the portion of the image.

In another embodiment, the invention relates to a computer-implemented method for modeling a three-dimensional image with polygons having different levels of detail. The method includes initially modeling the three-dimensional image with a first plurality of polygons at a first level of detail. The first level of detail represent the coarsest level of detail available for modeling the three-dimensional image. The first plurality of polygons are provided as part of an input data set.

The method farther includes comparing a distance between a first polygon of the first plurality of polygons and an eye point to a predefined threshold distance value associated with a level of detail of the first polygon. If the distance is less than the predefined threshold distance value, the method substitutes in a second plurality of polygons for the first polygon. The second plurality of polygons are at a second level of detail higher than the first level of detail and computed in advance prior to a commencement of the initial modeling step and provided as part of the input data set.

These and other advantages of the present invention will become apparent upon reading the following detailed descriptions and studying the various figures of the drawings.

BRIEF DESCRIPTION OF THE DRAWINGS

FIG. 9B schematically illustrates, in accordance with one aspect of the present invention, a normal table for keeping track of the normals of the vertices.

FIGS. 12A–H illustrate some typical combinations of patch edges that may be employed to eliminate the potential existence of T-vertices.

DETAILED DESCRIPTION OF THE PREFERRED EMBODIMENTS

An invention is described for managing the levels of detail of objects in the rendition of three-dimensional images on a computer display screen. In the following description, numerous specific details are set forth in order to provide a thorough understanding of the present invention. It will be obvious, however, to one skilled in the art, that the present invention may be practiced without some or all of these specific details. In other instances, well known structures and process steps have not been described in detail in order not to unnecessarily obscure the present invention.

Figure 1A:
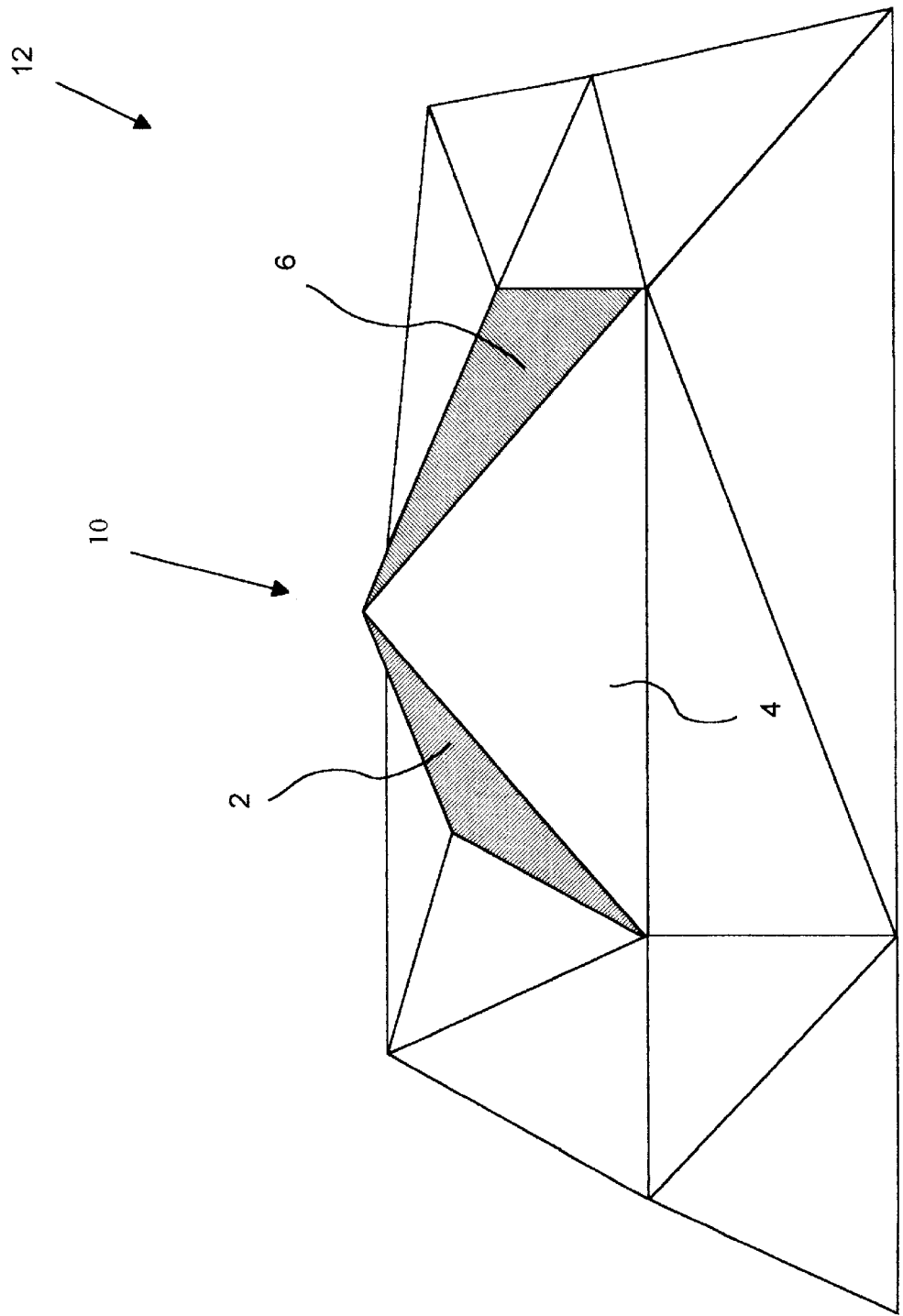
FIGS. 1A and 1B show, for illustration purposes, an object rendered in a coarser level of detail (FIG. 1A) and a finer level of detail (FIG. 1B).
Figure 1B:
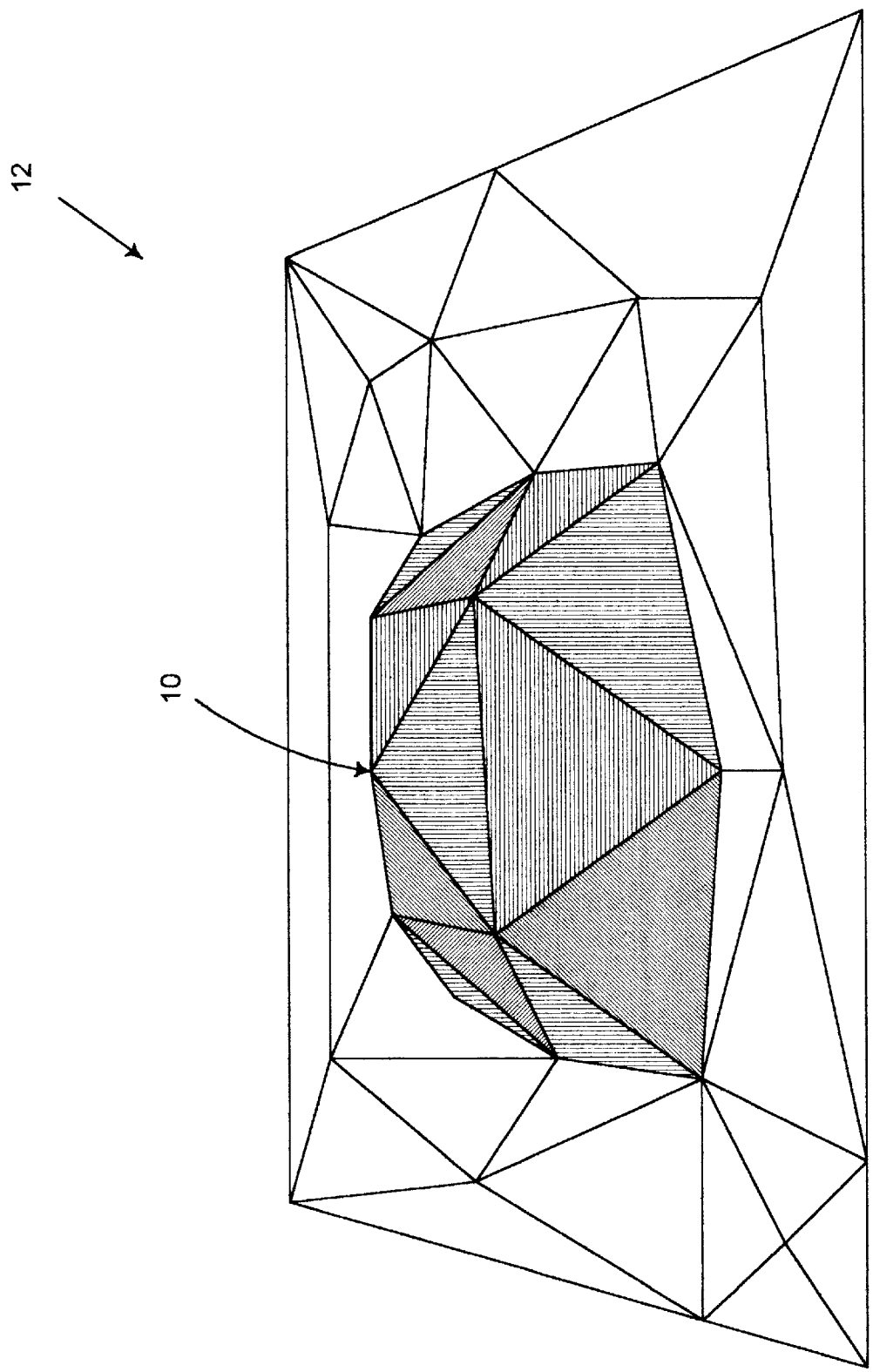
Figure 2:
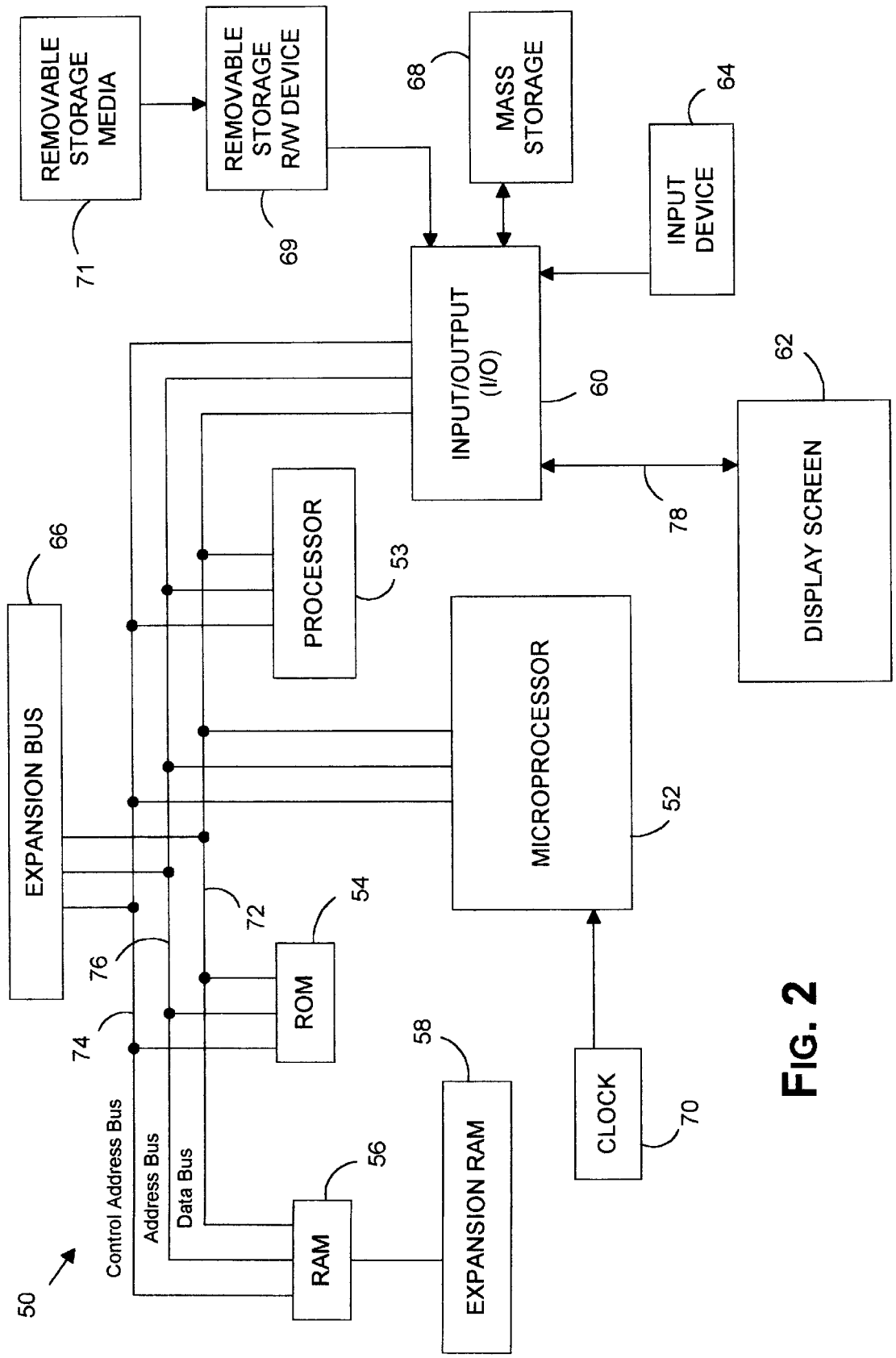
FIG. 2 illustrates a general purpose computer system, representing a suitable computer platform for implementing the inventive 3-D data rendering technique.

FIGS. 1A and 1B show, for illustration purposes, an object 10 rendered in a coarser level of detail (FIG. 1A) and a finer level of detail (FIG. 1B). FIG. 2 illustrates a general purpose computer system, representing a suitable computer platform for implementing the inventive 3-D image rendering technique. In FIG. 2, a general purpose computer system 50 includes a central processing unit (CPU) 52, read only memory (ROM) 54, random access memory (RAM) 56, expansion RAM 58, input/output (I/O) circuitry 60, display assembly 62, input device 64, and expansion bus 66. Computer system 50 may also optionally include a mass storage unit 68 such as a disk drive unit or nonvolatile memory such as flash memory and a real-time clock 70. Other CPU's, e.g., CPU 53, may optionally be provided to provide greater processing power. The use of multiple processors in a single computer system is well known in the art.

CPU 52 is preferably a commercially available, single chip microprocessor such as one of the Intel X86 or Motorola 680XX family of chips, or a reduced instruction set computer (RISC) chip such as the PowerPC microprocessor available from Motorola, Inc. In the preferred embodiment, CPU 52 represents a processor by MIPS, Inc., such as one of those employed in the Infinite Reality Engine computer system, available from Silicon Graphics, Inc. of Mountain View, Calif. CPU 52 is coupled to ROM 54 by a data bus 72, control bus 74, and address bus 76. ROM 54 contains the basic operating system for the computer system 50. CPU 52 is also connected to RAM 56 by busses 72, 74, and 76 to permit the use of RAM 56 as scratch pad memory. Expansion RAM 58 is optionally coupled to RAM 56 for use by CPU 52. CPU 52 is also coupled to the I/O circuitry 60 by data bus 72, control bus 74, and address bus 76 to permit data transfers with peripheral devices.

I/O circuitry 60 typically includes a number of latches, registers and direct memory access (DMA) controllers. The purpose of I/O circuitry 60 is to provide an interface between CPU 52 and such peripheral devices as display assembly 62, input device 64, and mass storage 68.

Display assembly 62 of computer system 50 is an output device. In the case of certain computers, such as pen-based or touch-sensitive computers, display assembly 62 may also serve as a part of the input device. When operating as an input device, a position-sensing apparatus disposed on the surface of display assembly 62 works in cooperation with input device 64 to receive data input from the user. Accordingly, it is coupled to I/O circuitry 60 by a data bus 78. When operating as an output device, the display assembly 62 receives data from I/O circuitry 60 via bus 78 and displays that data on a suitable screen. Note that unless display assembly 62 serves an input function, it is not absolutely necessary that data bus 78 be bi-directional.

The screen for display assembly 62 may be a device that uses a cathode-ray tube (CRT), liquid crystal display (LCD), or the like, of the types commercially available from a variety of manufacturers. Input device 64 may be a joystick, a keyboard, a mouse, a stylus working in cooperation with a position-sensing display, or the like. Alternatively, input device 64 may be an embedded RF digitizer activated by an "active" RF stylus. Therefore, as used herein, the term input device will refer to any mechanism or device for altering the position of the eye point, entering data and/or pointing to a particular location on a screen of a computer display. The aforementioned input devices are available from a variety of vendors and are well known in the art.

Some type of mass storage 68 is generally considered desirable. However, mass storage 68 can be eliminated by providing a sufficient amount of RAM 56 and expansion RAM 58 to store user application programs and data. In that case, RAMs 56 and 58 can optionally be provided with a backup battery to prevent the loss of data even when computer system 50 is turned off. However, it is generally desirable to have some type of long term mass storage 68 such as a commercially available hard disk drive, nonvolatile memory such as flash memory, battery backed RAM, PC-data cards, or the like.

A removable storage read/write device 69 may be coupled to I/O circuitry 60 to read from and to write to a removable storage media 71. Removable storage media 71 may represent, for example, a magnetic disk, a magnetic tape, an opto-magnetic disk, an optical disk, or the like. In one embodiment, instructions for implementing the inventive method may be provided to computers or computer networks via such a removable storage media.

In operation, information is input into the computer system 50 by manipulating the input device, e.g., a joystick. CPU 52 then processes the data under control of an operating system and an application program stored in ROM 54 and/or RAM 56. CPU('s) 52 then typically produces data which is output to the display assembly 62 in order to produce appropriate images on its screen.

Expansion bus 66 is coupled to data bus 72, control bus 74, and address bus 76. Expansion bus 66 provides extra ports to couple devices such as network interface circuits, modems, display switches, microphones, speakers, etc. to CPU 52. Network communication is accomplished through the network interface circuit and an appropriate network.

Still further, the present invention relates to machine readable media on which are stored program instructions for performing operations on a computer. Such media includes, by way of example, magnetic disks, magnetic tape, optically readable media such as CD-ROMs, semiconductor memory such as PCMCIA cards, etc. In each case, the medium may take the form of a portable item such as a small disk, diskette, cassette, etc., or it may take the form of a relatively larger or immobile item such as a hard disk drive or RAM provided in a computer.

In accordance with one aspect of the present invention, polygonal faces that are employed to model objects at a coarser level of detail are not dynamically subdivided during run time into polygonal faces for modeling objects at finer levels of detail. To reduce the computational load at run time, the inventive data rendering technique preferably substitutes existing (parent) faces with more detailed (child) faces in order to model objects at higher levels of detail. The child faces themselves are computed in advance and are simply swapped with the parent face, thereby minimizing the computational load during run time.

The set of data representing the faces at different levels of detail is required as an input data set. The exact algorithm, method, or tool employed to obtain this data set is not particularly relevant to the present invention. Preferably, the input data set includes all base faces (i.e., faces at the coarsest level of detail) that are necessary to model objects of the image at their lowest level of detail. Further, data regarding the detailed faces (i.e., faces required to model the image objects at higher levels of detail) is preferably included as well. Additionally, there is included data for logically linking a parent face, e.g., a face at a coarser level of detail, and its progeny faces (child/grandchild faces).

The inventive data rendering further involves the use of a novel face queue to facilitate the recursive examination of portions of the image to be rendered. As will be discussed in detail herein, the use of the face queue, in combination with the inventive data rendering technique, permits the faces to be examined in the order of their levels of detail. In one embodiment, the invention selects from all possible faces from different levels of detail that can be displayed and combines them together into a smooth image.

Figure 3:
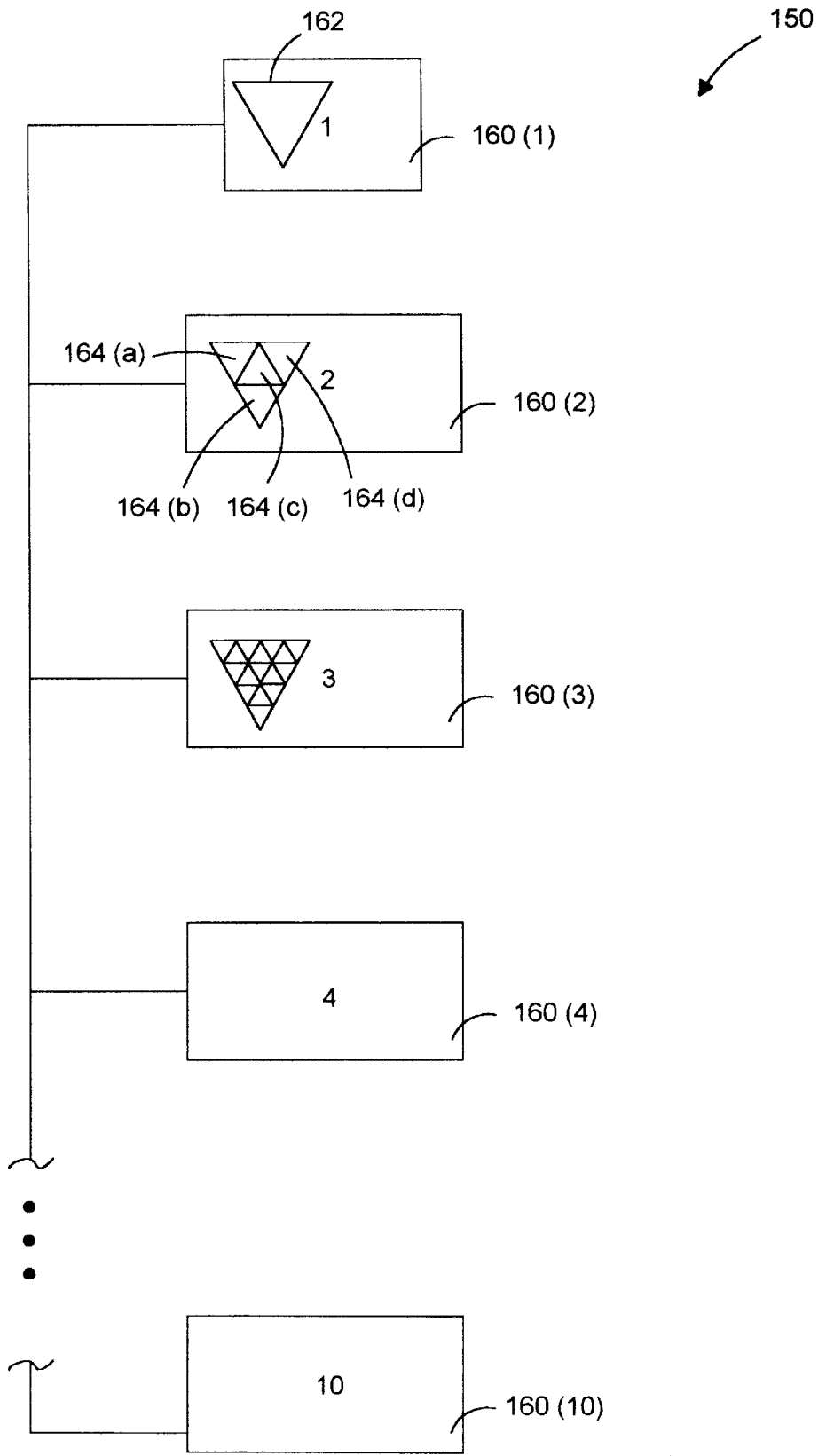
FIG. 3 schematically illustrates, in accordance with one aspect of the present invention, a data structure suitable for storing representations of all displayable faces, i. e., from the coarsest to the finest level of detail, of an image.

Referring now to FIG. 3, there is shown a data structure 150, representing the data structure for storing representations of all displayable faces, i.e., from the coarsest to the finest level of detail. As mentioned earlier, all displayable faces are preferably computed in advance and provided as an input data set. This is in contrast to the prior art approach wherein only the faces at the coarsest levels are stored in advance and all other faces are computed during run time according to some set of rules for subdividing faces.

In FIG. 3, data structure 150 includes data levels 160 (1–10). In the preferred embodiment, there are provided 10 data levels, 160(1–10). It will appreciated by those skilled in the art that a greater or fewer number of data levels may be employed, depending on the nature of the image to be rendered. In this implementation, data level 160(1) represents the coarsest level of detail whereas data level 160(10) represents the data level having the highest level of detail. Each of data levels 160(1–10) contains face data sufficient to model the entire image (such as image 12 of FIGS. 1A and 1B) at its particular level of detail. If one merely displays all the face data stored in a given data level, such as data level 160 (3), an image will be formed out of faces having a uniform level of detail.

Data level 160(1) may include face data regarding, for example, face 162. Of course, multiple faces 162 may exist in data level 160(1) to adequately model a complete image at the detail level represented by data level 160(1). At data level 160(2), the object represented by face 162 may be represented by, for example, four child faces 164 (a–d). At data level 160(3), the object represented by face 162 (or child faces 164(a–d) at data level 160(2)) may be represented by, for example, 16 grandchild faces. As the terms are used herein, a face is a base face if it is at the coarsest level of detail, i.e., a face associated with data level 160(1) of FIG. 3. A parent face has a coarser level of detail than faces which replace it. If the faces that replace a parent face are only one level of detail higher than the parent face, these faces are called child faces. On the other hand, if the parent face is replaced by faces that are two levels of detail higher than itself; these replacement faces are called grandchild faces, and so on. By mixing faces at different levels of detail, e.g., those at data levels 160(2) and 160(3), objects in an image may be satisfactorily modeled without employing an undue number of polygonal faces (as would be the case if all objects in an image are modeled with the same high level of detail without regard to their distance to the eye point).

Figure 4:
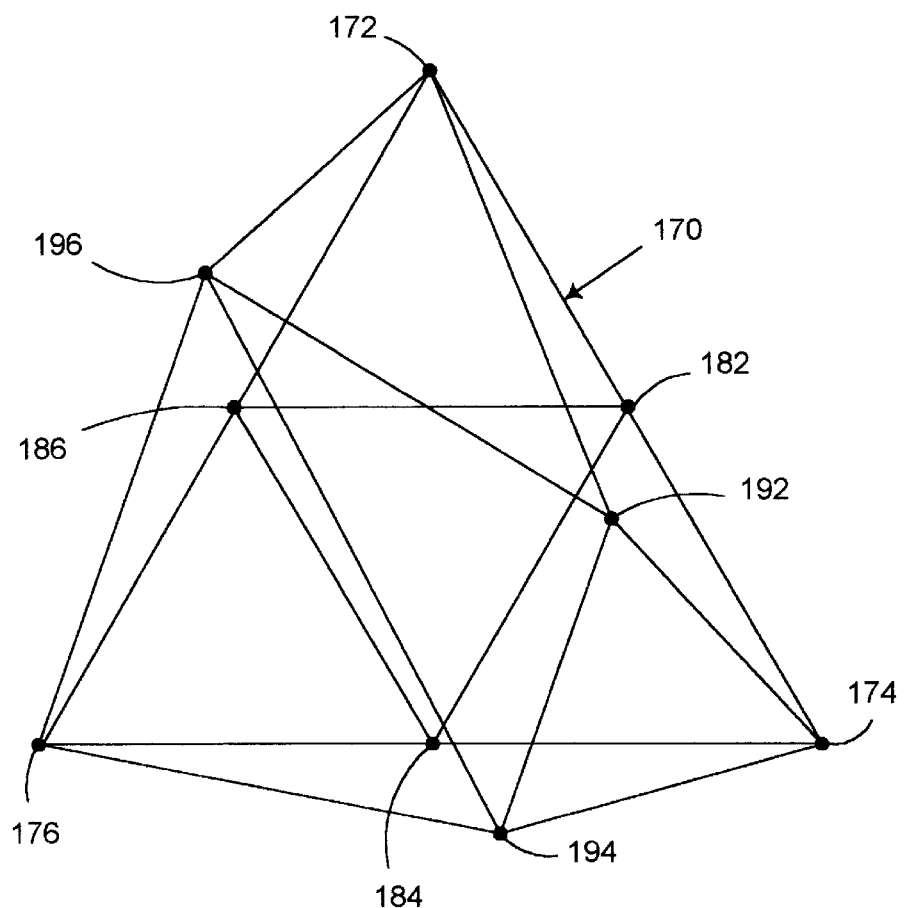
FIG. 4 illustrates a face being substituted by its child faces before and after morphing.

For each face stored in data structure 150, three sets of values for defining the end vertices of the face are preferably stored. With reference to FIG. 4, the three end vertices of face 170 are shown as end vertices 172, 174, and 176. Additionally, up to three split vertices, which define the locations along the edges of a face where the face can be substituted by its child faces, may be stored. The split vertices are shown in FIG. 4 as split vertices 182, 184, and 186. In one embodiment, the split vertices may be defined simply as the mid-point of the line joining a pair of end vertices, e.g., split vertex 182 on the line joining end vertices 172 and 174. If the face is a triangle, which is typically the case, fewer than three split vertices may be provided per triangle face if the triangles adjacent to a given edge are not expected to split, e.g., if that edge abuts the horizon in the terrain image.

There may be stored up to four child faces, i.e., the faces that are employed to replace a parent face in order to increase the level of detail displayed. With reference to FIG. 4, the four child faces are shown as those defined by vertices (172, 182, 186), (174, 182, 184), (176, 184, 186), and (182, 184, 186). Advantageously, the data regarding the child faces and split vertices represent the logical link from one level of detail to the next level of detail on a face-by-face basis. This linkage permits the faces to be replaced individually to produce a smoother transition when the LOD changes. In contrast, the prior art typically swaps an entire grid of faces when the LOD changes, which tends to disrupt visual continuity.

Each of the end vertices and split vertices associated with a face at a given level of detail is preferably stored as two sets of values: a start value set and an end value set. The start and end value sets of these vertices, whether end vertices or split vertices, are useful in morphing operations. As is well known to those skilled in the art, morphing is a process of gradually moving a vertex between two or more locations to gradually transform a face. Morphing preserves the visual continuity as it tends to hide the change in the geometry of the faces.

In general, when child faces are substituted into a parent face, they are substituted co-planar with the parent face, i.e., the child faces occupy the same space as the parent face. In subsequent frames, the vertices morph and are moved to their end positions. With reference to FIG. 4, the end positions for split vertices 182, 184, and 186 are shown by vertices 192, 194, and 196, respectively. This morphing process occurs as the distance from the eye point to the face under consideration decreases. Preferably, the morphing process will be gradual, facilitated by interpolation in accordance with the distance between the eye point and the faces, such that the change in geometry will be gradual and substantially undetectable to the human observer.

Initially all the base faces, i.e., faces at the coarsest level of detail, are stored in a face queue. The face queue may be implemented by, for example, a first-in-first-out (FIFO) queue. Each face is then taken off the top of the queue to be examined. If a face is sufficiently detailed in view of its distance to the eye point, it is put into a display list to be displayed. Otherwise, its child faces will be put back into the queue bottom to be further examined at a subsequent time.

Figure 5:
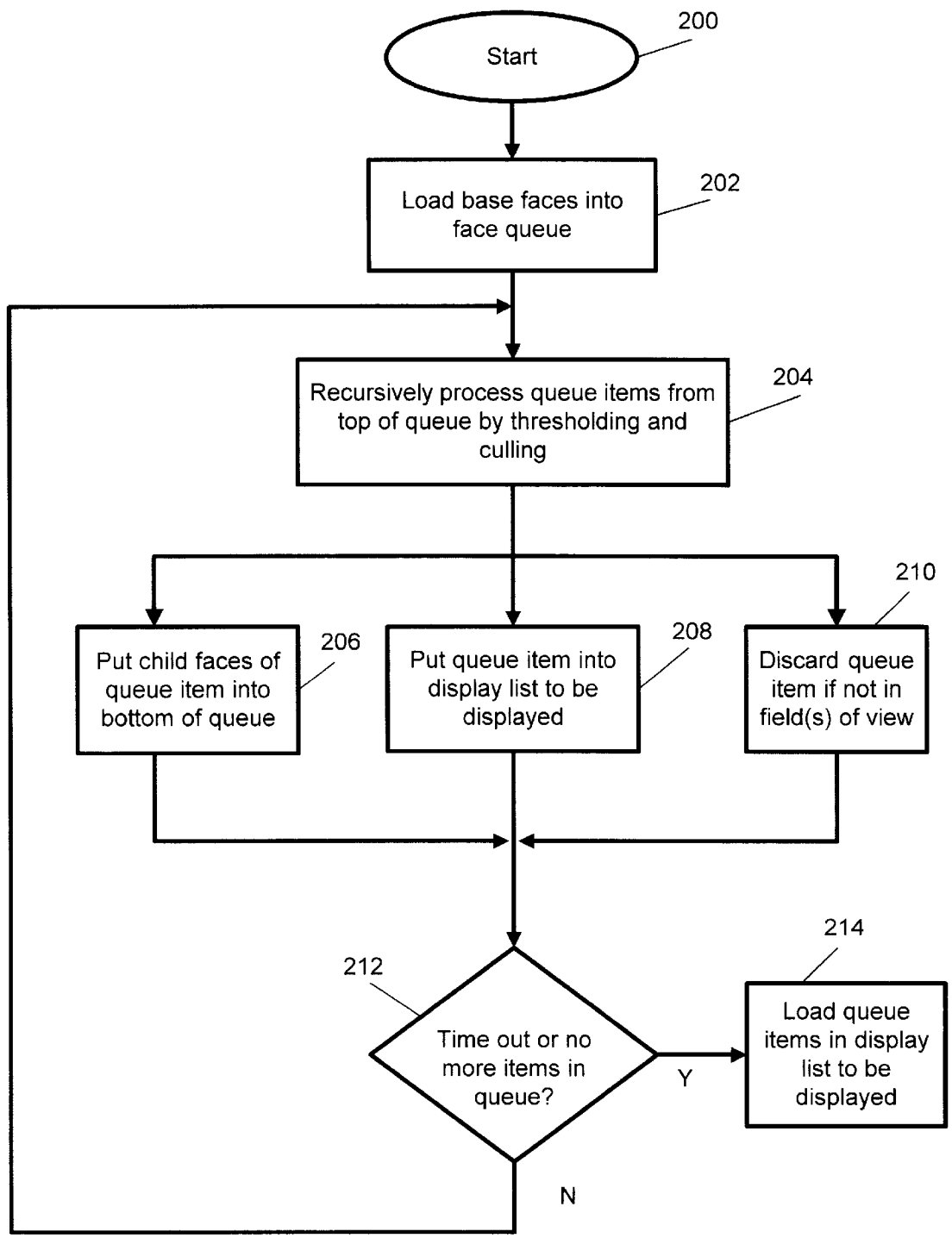
FIG. 5 is a flow chart illustrating, in accordance with one aspect of the present invention, the inventive data rendering technique which is employed to perform face substitution to model portions of the image at various levels of detail.

FIG. 5 is a flow chart illustrating, in accordance with one aspect of the present invention, the recursive traversal technique which is employed to perform face substitution to model portions of the image at various levels of detail. The traversal steps of FIG. 5 are preferably employed to model every frame image. In step 202, all base faces, i.e., those having the coarsest level of detail for rendering the image, are loaded into the face queue. With reference to FIG. 3, these are the faces stored at data level 160(1) of data structure 150. The base faces may be loaded in any sequence. Preferably, the base faces are loaded in the order in which they are saved in data level 160(1) of data structure 150 for simplicity.

In step 204, the queue items, i.e., the faces stored in the face queue, are processed by thresholding and optionally by culling, starting with the queue item at the top of the queue. In thresholding, a particular queue item is tested to determine whether it is sufficiently detailed, e.g., as a function of its distance to the eye point, to be put into a display list for subsequent display. Thresholding is discussed in greater detail in a subsequent FIG. 6 herein.

In culling, any face that is not within the field of view of the current frame is preferably discarded from the queue. A face may not be in the field of view of the current frame if it, for example, is in the portion of the image that is behind the eye point, e.g., a portion of the terrain behind the viewer. There is no need to further examine a face that is not within the field of view of the current frame since neither that face nor the faces that may replace it will be displayed. Culling is an optional step and may be employed even when there are multiple fields of view to be displayed simultaneously. In the case of multiple fields, if a face is not in any of the fields of view displayed, it is simply culled out. As can be appreciated, this culling process greatly improves efficiency by reducing the number of queue items that require examination. Note that culling may occur either before or after the base faces are loaded into the face queue. In the preferred embodiment, all faces having the coarsest level of detail are loaded into the face queue. During the examination step 204, the faces that are not in the field or fields of view of the current frame are then culled from the queue.

Responsive to the determination in step 204, a face may be deemed to have too low of a level of detail given its distance to the eye point. Consequently, it may be replaced or substituted by its child faces. As seen in step 206, the replacement is performed when its child faces are put into the queue bottom to be subsequently examined. Alternatively, a queue item may be deemed in step 204 to be sufficiently detailed given its distance to the eye point. As shown in step 208, that queue item may then be put into a display list to be displayed subsequently. As a further alternative, a face may be deemed to be outside of any of the field or fields of view of the current frame. As discussed earlier, such a face is preferably culled from the face queue to improve the efficiency of the data rendering procedure. The step of culling is shown in step 210.

The use of a face queue in combination with a display list to process the faces has important, albeit nonobvious, advantages. In accordance with one particularly advantageous aspect of the present invention, all the faces that are required for rendering the portion of an image within the present frame's field(s) of view may be found at any point in time in the face queue and in the display list (the number of faces required for modeling the portion of the image within the present frame's field(s) of view may be less than the number of faces required for modeling the entire image since some faces may have been discarded as being outside of the current frame's field(s) of view). Advantageously, when the time available for processing the current frame runs out, the faces in the face queue and the drawing list may be drawn immediately on the display screen to, for example, keep up with a required frame rate.

As can be appreciated, the drawing of faces from the face queue, which have not by definition been examined, represents a rendition of an incompletely modeled image. While such a rendition is generally undesirable if there is still time to complete the modeling process, there may be times when such a rendition is unavoidable, e.g., while rendering complex images at a fairly high frame rate. In such times, the inventive data rendering technique advantageously outputs an image which, while being incomplete in its modeling, is still substantially correct at some lower level of detail. This is because the inventive data rendering technique, via the FIFO face queue, examines all faces that are associated with a coarser level of detail before any face having a higher level of detail is examined. In contrast, if the technique had examined each face by following its child faces, its grandchild faces, and other progeny faces until the appropriate level of detail is satisfied, the image dumped to the display screen when time runs out may not be correct at any level of detail. In that case, the viewer may see a portion of the image being highly modeled while other portions are substantially unexamined.

With reference to FIG. 5, step 212 represents the step wherein either the time available for processing a certain frame has expired, or there are no more items in the face queue to be examined. In either case, the method proceeds to step 214 wherein all the queue items, if any, are loaded into the display list to be subsequently displayed.

On the other hand, if there are additional queue items in the face queue to be examined and the time available for processing the frame has not expired, the method returns to step 204 wherein the next queue item from the top of the queue is retrieved and examined.

Figure 6:
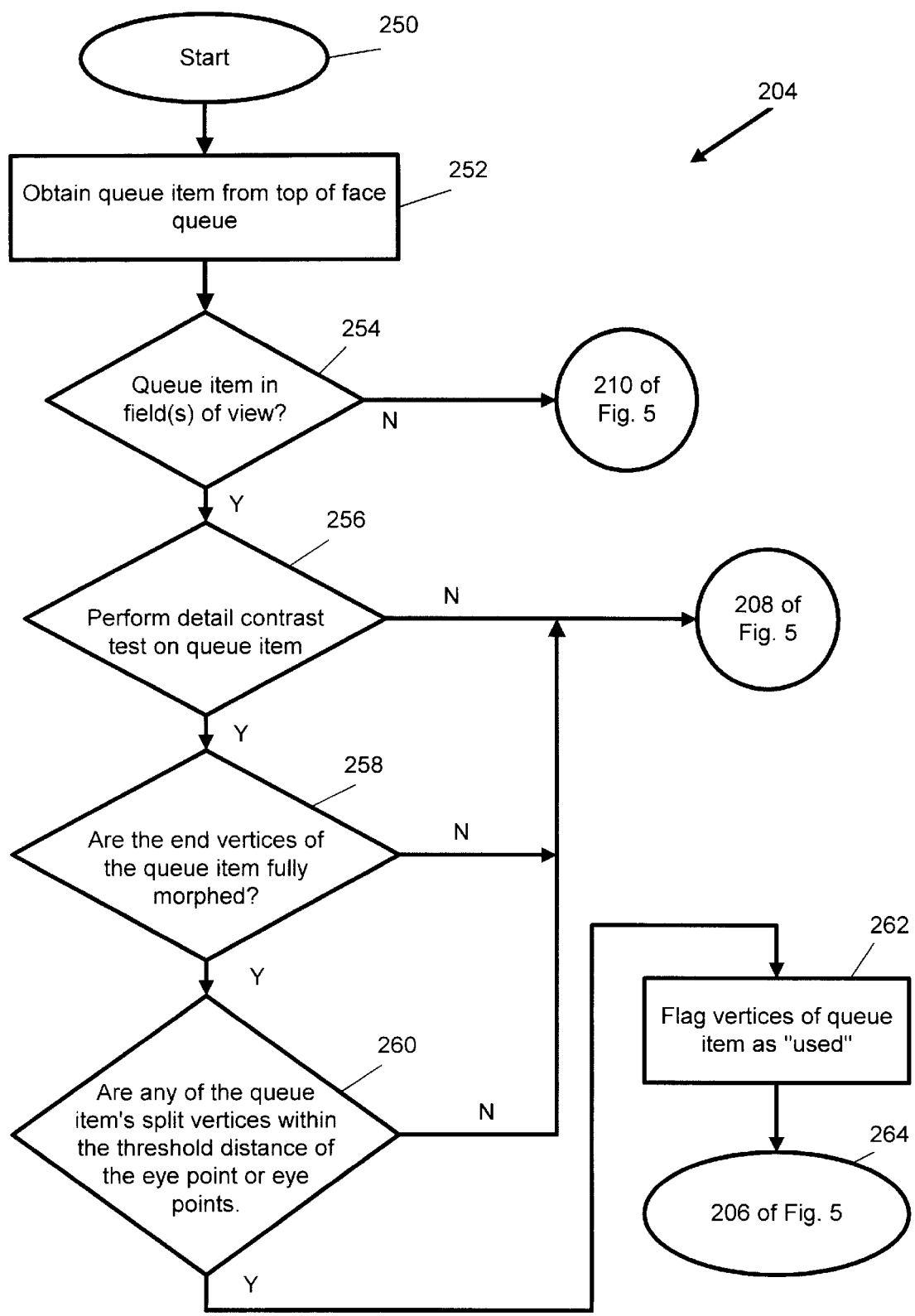
FIG. 6 is a flow chart illustrating in greater detail step 204 of FIG. 5 wherein a face from the top of the queue is examined to ascertain whether it can be displayed given its position relative to the field(s) of view and its current level of detail.

FIG. 6 is a flow chart illustrating in greater detail step 204 of FIG. 5 wherein a face from the top of the queue is examined to ascertain whether it can be displayed given its position relative to the field(s) of view, its distance to the eye point, and its current level of detail. In step 252, a queue item at the top of the face queue is retrieved to be examined. Step 254 represents the optional culling step wherein, as mentioned earlier, it is ascertained whether the queue item obtained in step 252 is within the field(s) of view of the current frame. If not, this face is removed from the face queue as discussed in step 210 of FIG. 5.

On the other hand, if the queue item is in one of the fields of view of the current frame, the method proceeds to step 256 wherein a detail contrast test is performed on the queue item. The detail contrast test is performed to ensure that there is a substantially seamless match between adjacent faces having different levels of detail. In the preferred embodiment, a constraint is imposed on the substitution process wherein a face can only be +/−1 level of detail (LOD) away from its adjacent neighbor. Depending on the image to be rendered and the overall level of detail desired, the constraint may of course be set to any number other than 1. The detail contrast test prevents a face from being substituted by child faces if such substitution would result in a difference in the levels of detail that is greater than the constraint.

Figure 7A:
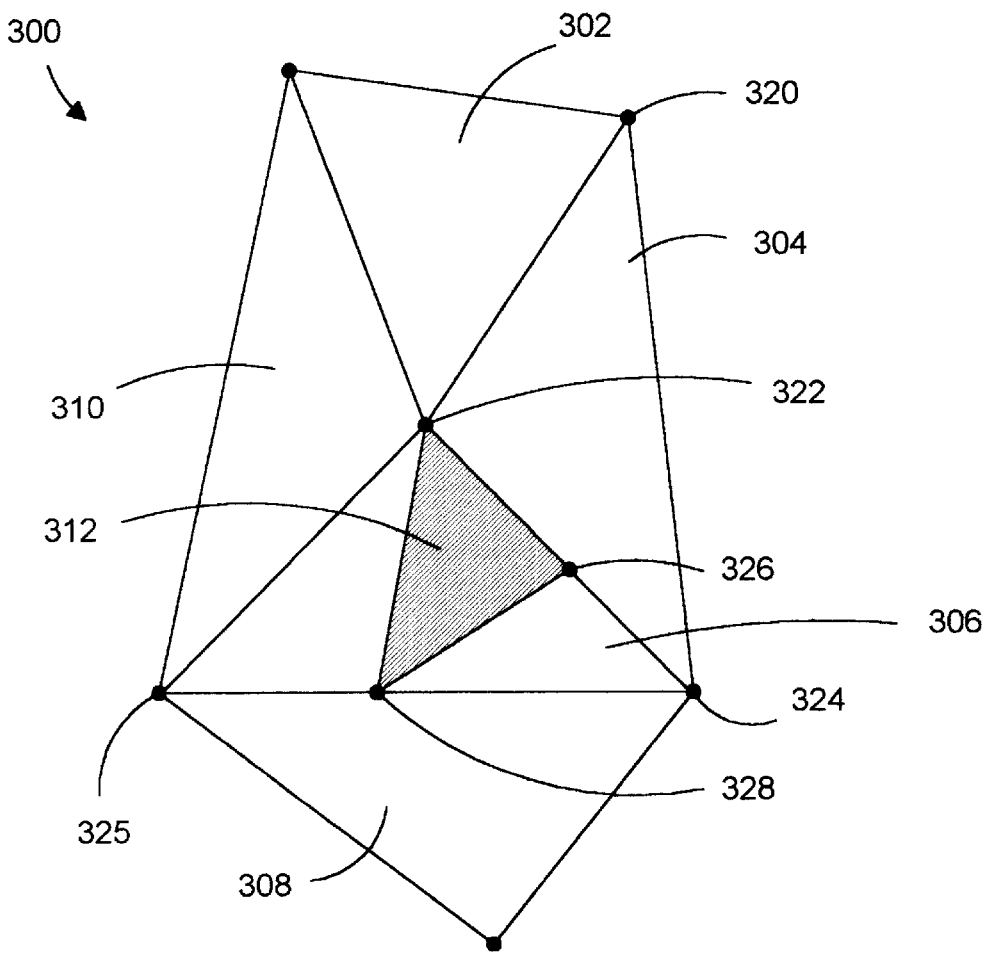
FIG. 7A illustrates a portion of an image, including a plurality of faces, to facilitate discussion of the detail contrast test in accordance with one aspect of the present invention.
Figure 7B:
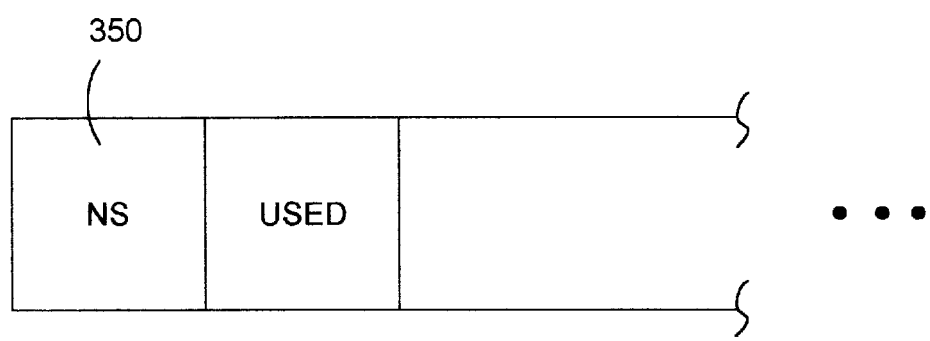
FIG. 7B illustrates the flags that may be associated with a vertex.

The detail contrast test of step 256 of FIG. 6 may be more clearly understood with reference to FIGS. 7A and 7B. Referring now to FIG. 7A, a portion 300 of an image to be rendered is shown. In FIG. 7A, there are shown five faces 302, 304, 306, 308, and 310. Face 312 (defined by vertices 322, 326, and 328) represents a child face of face 306 (defined by vertices 322, 324, and 325) and further represents the face undergoing the detail contrast test of step 256 of FIG. 6. Assume for the moment that a constraint has been imposed on the substitution process that a face can only be +/−1 level of detail difference from its adjacent neighbor. If any of the neighbors of the parent face of face 312, i.e., faces 302, 304, 310, or 308 which are neighbors of parent face 306, is on the display list, i.e., they did not put their child faces in the face queue for further examination, then face 312 cannot be substituted by its child faces in the face queue. Instead, face 312 must instead be moved to the display list to be displayed. Face 312 cannot be replaced by its child faces irrespective of its distance to the eye point since the replacement of face 312 by its child faces would result in a difference of two or more levels of detail between the child faces of face 312, and the to-be-displayed neighbors of face 306, i.e., faces 302, 304, 308, and 310.

In accordance with one aspect of the present invention, the detail contrast test for a given face is performed by examining flags associated each of its end vertices. In the preferred embodiment, each end or split vertex of a face is associated with a series of flags. One of these flags is a no-split (NS) flag (shown as flag 350 in FIG. 7B). The NS flag is employed to signal whether a particular face can be substituted by its child faces without violating the constraint imposed. Referring back to FIG. 7A, when any of faces 302, 304, 308, and 310 is put on the display list, all its end vertices and split vertices will have their NS flag set. With reference to face 304, for example, the NS flag will be set for end vertices 320, 322, 324, and split vertex 326. If there are other vertices (end or split), their associated NS flags will be set as well.

When face 312 undergoes a detail contrast test, as is done in step 256 of FIG. 6, all its end vertices, i.e., vertices 322, 326, and 328, are tested to ascertain whether their no-split flags have been set. Since face 304 has been put on the dispay list, vertex 326 would have its no-split (NS) flag set, signaling that face 312 cannot be substituted by its child faces without creating a difference in the levels of detail that is greater than 1. Note that since the faces that make up an image are examined in the order of their levels of detail from the coarsest level of detail to the finest levels of detail, all the faces at the coarser level of detail would essentially have a vote regarding their split vertices and consequently, regarding the end vertices that are employed at the finer level of detail by the adjacent faces.

If the queue item currently under examination in step 256 of FIG. 6 fails to pass the detail contrast test, i.e., it cannot be substituted by its child faces without violating the predefined constraint, the queue item currently under examination is loaded into the display list to be displayed (step 208 of FIG. 5). On the other hand, if it is ascertained in step 256 that the substitution of a face by its child faces will not violate the aforementioned predefined constraint, the method proceeds to step 258 wherein it is ascertained whether the end vertices of the queue item currently under examination have been fully morphed. In one embodiment, the end vertices of the queue item are deemed fully morphed when they coincide with the end values for those end vertices, which values are furnished in the input data set and stored in data structure 150 of FIG. 3, for example. It is preferable that a face be fully morphed before it can be replaced by its child faces. If the queue item is not fully morphed, its end vertices may not be in the correct position for a co-planar substitution by its child faces.

If the end vertices of a queue item are not filly morphed, the queue item under examination is loaded into the display list to be displayed (step 208 of FIG. 5).

On the other hand, if it is ascertained in step 258 that the end vertices of the queue item currently under examination have been fully morphed, the method proceeds to step 260 wherein a threshold test is performed on the split vertices of the queue item. The threshold test is performed to ascertain whether the queue item under examination is sufficiently detailed given its distance from the eye point. If the distance from a queue item's split vertex, or preferably all of the queue item's split vertices, is further away than the threshold at this level of detail (each level of detail has a corresponding predefined threshold value), the queue item can be passed onto the display list to be displayed (step 208 of FIG. 5).

On the other hand, if the distance between any of the queue item's split vertices and the eye point is less than the threshold distance at the current level of detail, the queue item is deemed to be not sufficiently detailed. In that case, the queue item will be replaced by its child faces (step 264 of FIG. 6). Before the child faces of the queue item are put into the bottom of the queue to be examined (step 206 of FIG. 5), the end vertices of that queue item will have its "used" flag set in step 262. The setting of the "used" flag signifies that these end vertices will be used by some progeny faces, i.e., faces having a higher level of detail, since this particular face will be substituted by progeny faces to model the underlying portion of the image in greater detail.

Figure 8:
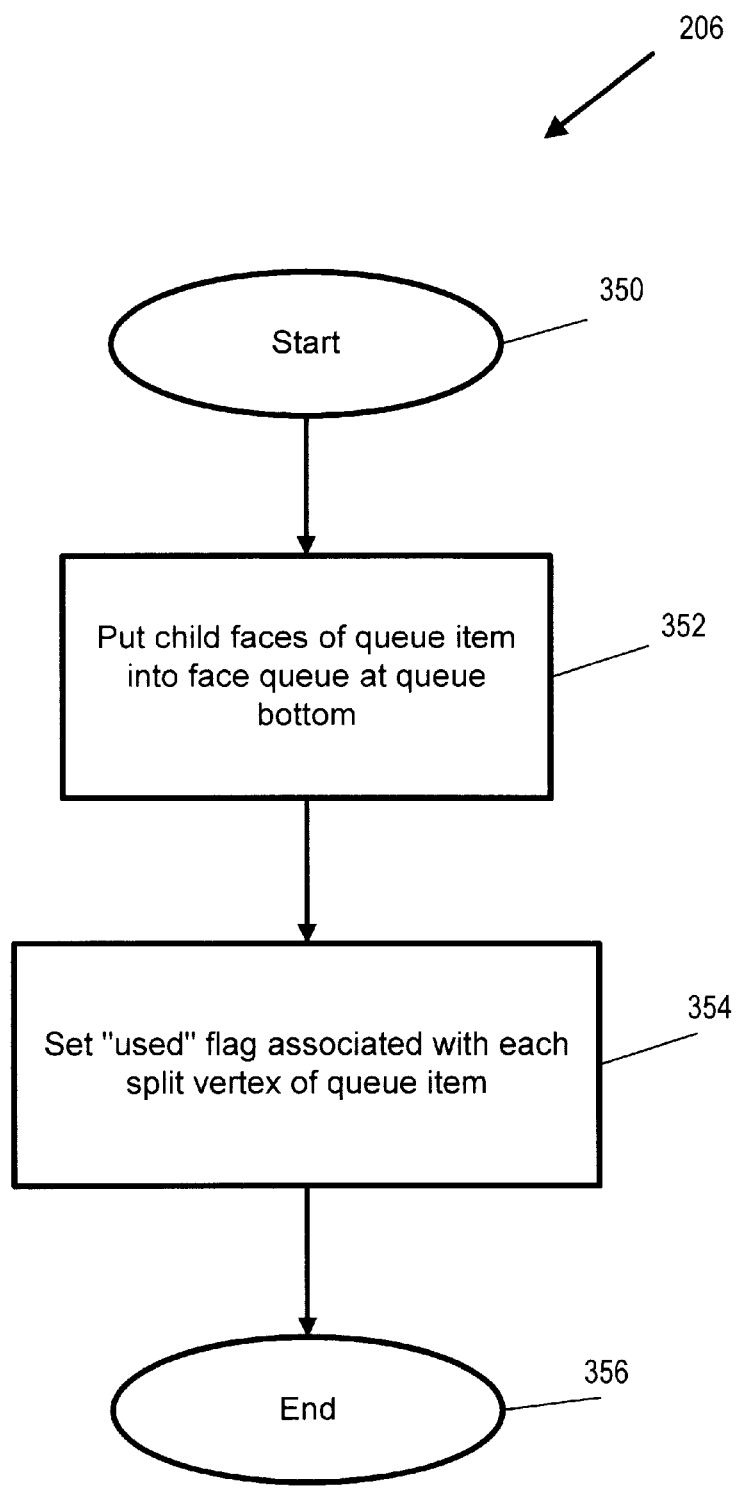
FIG. 8 is a flow chart illustrating in greater detail the substitution step 206 of FIG. 5.

FIG. 8 is a flow chart illustrating in greater detail the substitution step 206 of FIG. 5 wherein the child faces of a queue item are put into the bottom of the queue for subsequent examination when the queue item is deemed to have an insufficient level of detail given its distance to the eye point. Either before or after the child faces of the queue item under examination can be put into the bottom of the face queue for further examination, the "used" flag associated with each of the split vertices of the queue item currently under examination is set. The "used" flag is set since the child or grandchild faces of this queue item will employ those split vertices as their end vertices. With reference to FIG. 8, the child faces of the queue item currently under examination are put back into the face queue at the queue bottom in step 352. In step 354, the "used" flags associated with the split vertices of the queue item under examination are set.

Figure 9A:
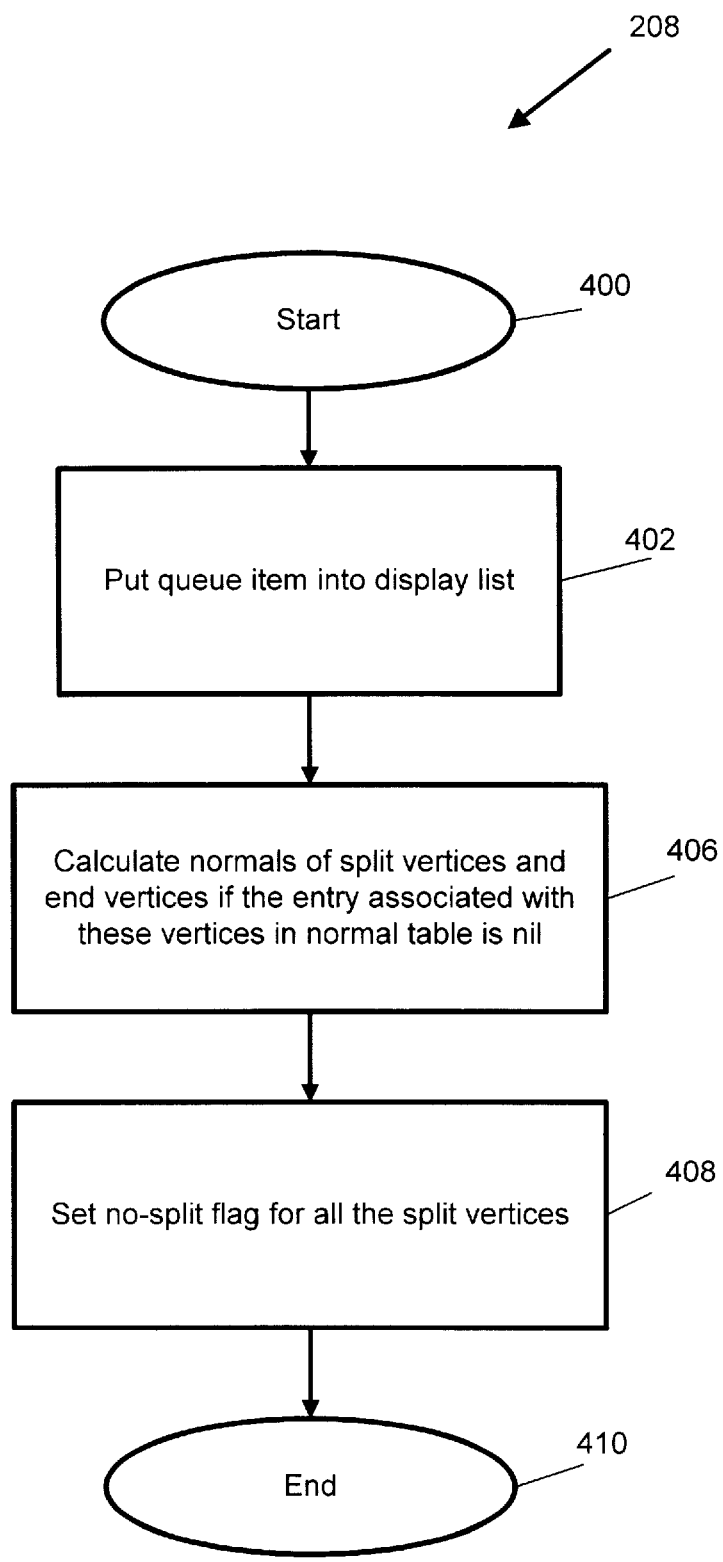
FIG. 9A is a flow chart illustrating in greater detail step 208 of FIG. 5 wherein the queue item currently under examination is loaded into the display list to be displayed.

FIG. 9A is a flow chart illustrating in greater detail step 208 of FIG. 5 wherein the queue item currently under examination is loaded into the display list to be displayed. The queue item is loaded into the display list in step 208 because it satisfies the threshold test performed in step 204 of FIG. 5. In step 402, the queue item currently under examination is put into the display list. The display list may be implemented by, for example, a first-in, first-out (FIFO) queue or a table. Using the data in this display list, the model of the image is then drawn on display screen.

In step 406, the normals for the split vertices and end vertices of the current queue item are computed (if not computed already), to facilitate shading. Shading is conventional in the art and is not explained in detail here to simplify discussion. The calculation of the normals is performed in step 406 since it is known at step 406 that the current queue item will be put into the display list to be displayed.

In one embodiment, there is provided a normal table in which the normal values for all vertices, i.e., vertices associated with faces at all levels of detail, are kept. Preferably, a unique vertex ID, which is furnished with each vertex, is employed as a search key for the table entries, e.g., the vertex ID corresponds to the entry number in the table. Each unique vertex ID has a corresponding normal value in the normal of FIG. 9B. If a normal value has not been calculated, the method calculates the normal value at step 406 of FIG. 9A. The calculation of a normal at a particular vertex is known in the art.

In step 408, the no-split (NS) flag associated with all the split vertices of this queue item are set. The setting of the NS flags, which in this case are associated with the split vertices of the queue item about to be displayed, prevents the neighboring faces from splitting in a way that violates the predefined constraint. In one embodiment, for example, the predefined level is 1 and the setting of the NS flags prevents neighboring faces from being substituted by faces having a higher level of detail which would result in a difference of greater than 1 in the levels of detail.

Once all the faces are loaded into the display list, the method then proceeds to display the faces on the display screen to present the user with a geometric model of the image. As mentioned earlier, all the faces from the face queue may be loaded into the display list either when the time available for modeling a particular image in a particular frame has run out or when all faces in the face queue have been examined and found to be sufficiently detailed to be displayed (given their respective distance to the eye point).

Figure 10:
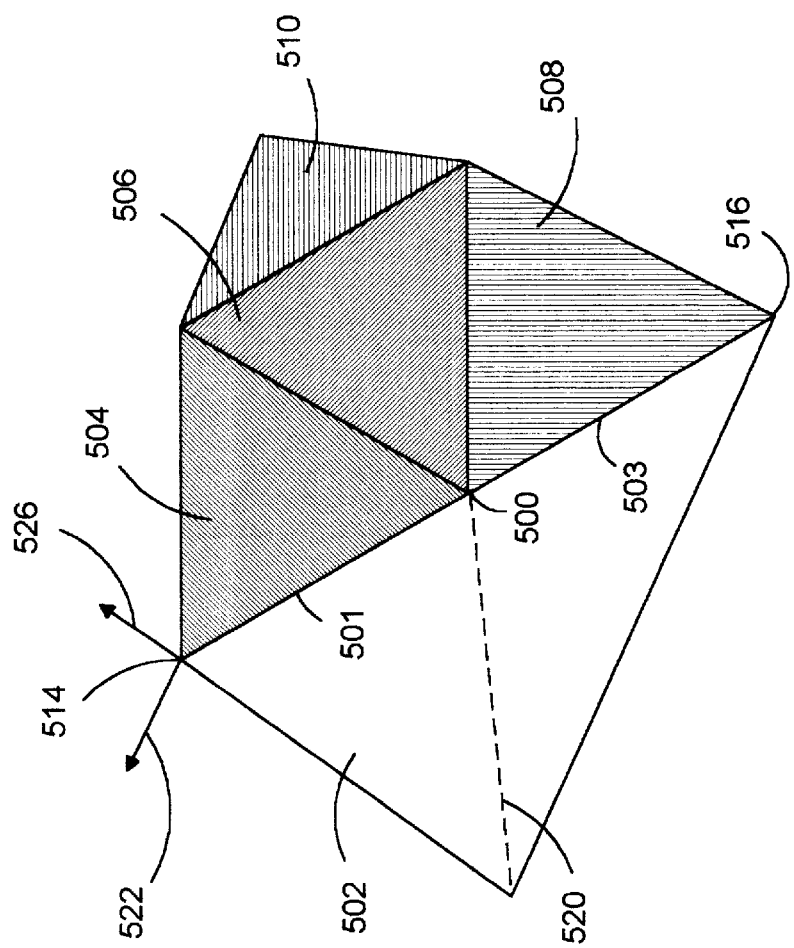
FIG. 10 illustrates a portion of an image being modeled to facilitate discussion of the inventive T-vertex patching aspect of the present invention.

Before actually drawing the faces in the display list, the invention preferably ascertains whether T-vertex patching is necessary. To facilitate discussion of the T-vertex problem, reference should now be made to FIG. 10. In FIG. 10, a T-vertex potentially exists at point 500, which is a split vertex of face 502 and an end vertex of faces 504, 506, and 508. A T-vertex potentially exists at point 500 when faces 502, 504, 506, 508, and 510 are placed into the display list for display and a T junction may be formed if left uncorrected.

If the faces are drawn without regard to the existence of this potential T-vertex at point 500, the shading between face 502 and faces 504/508 across the lines joining these neighboring faces will not match. This is because face 504 will shade its side of edge 501 by interpolating between its two end vertices, 500 and 514. Likewise, face 508 will shade its side of edge 503 by interpolating the color between its two end vertices, 500 and 516. However, face 502 will shade its side of the edge formed between vertices 514 and 516 by interpolating the color between the two end vertices of face 502, vertices 514 and 516. The difference in the interpolated values on opposing sides of the line joining points 516–522 will give rise to differences in shading, undesirably giving the illusion of a hard edge.

In accordance with one aspect of the present invention, a extra patch edge is introduced into the unsplit face, e.g., face 502 of FIG. 10, to eliminate the potential existence of a T-vertex. The extra patch edge is shown in FIG. 10 as patch edge 520. Now when faces 504, 508, and the two sub-faces of original face 502 are drawn, interpolation for shading purposes is done with the same set of coordinates, thereby substantially eliminating the undesirable shading effects introduced by T-vertices.

Figure 11:
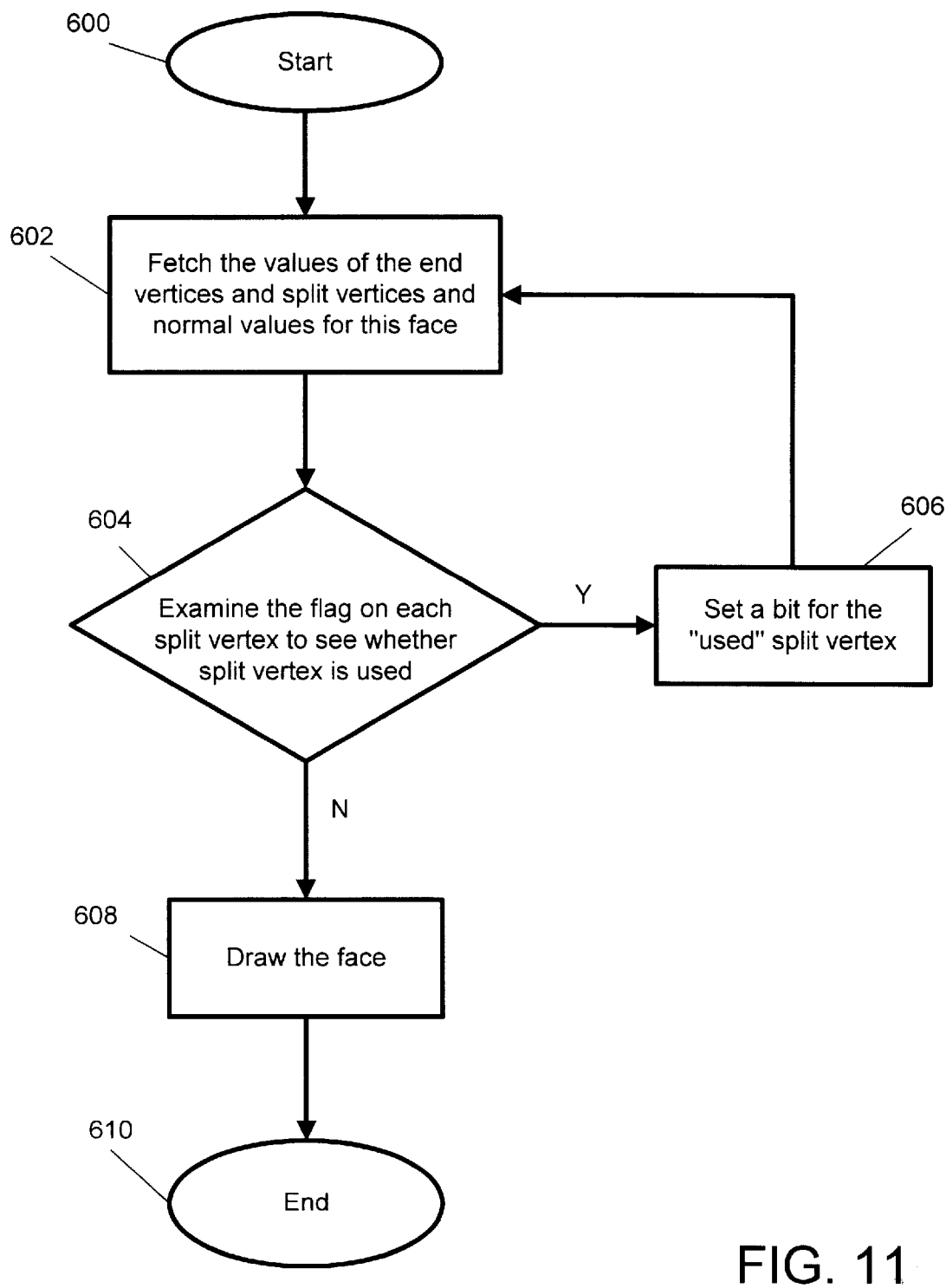
FIG. 11 is a flowchart illustrating, in accordance with one aspect of the present invention, the steps involved in displaying faces that have been placed into the display list, including the steps for eliminating the potential existence of T-vertices.

FIG. 11 is a flowchart illustrating, in accordance with one aspect of the present invention, the steps involved in displaying faces that have been placed into the display list, including the steps for eliminating the potential existence of T-vertices. The steps of FIG. 11 are preferably performed for each face retrieved from the display list. In step 602, the values for the end vertices and the split vertices of the face presently under consideration are obtained. These values are stored, in one embodiment, in a vertex table which employs the unique vertex ID's as a search key to improve efficiency.

In steps 604 and 606, all the split vertices of the present face are examined to see whether any of them has been "used" by some other faces as end vertices. Since the present face is in the display list to be displayed, such a detection indicates that neighboring faces may be employing the present face's split vertices as their end vertices, i.e., there is a potential for the existence of a T-vertex at the "used" split vertex location. It should be understood that the method loops through all the split vertices of the face to perform the test of step 604 prior to exiting to step 608.

In accordance with one aspect of the present invention, the patch edges are created responsive to the number of "used" split vertices detected, i.e., the split vertices that have their "used" flag set, as well as the locations of the split vertices. FIGS. 12A–H illustrate some typical combinations of patch edges that may be employed to eliminate the potential existence of T-vertices.

If no "used" split vertex is detected, the face may be displayed immediately without any patch edge (FIG. 12A1). This situation may be described by a 0,0,0 bit pattern that corresponds to edges c, b, and a (FIG. 12A2), wherein the bit for the corresponding edge is set if the corresponding edge contains a "used" split vertex.

If one split vertex is "used," the location of the patch edge created depends on the location of the face edge that contains the "used" split vertex. If the used split vertex resides only on side a (FIG. 12B), the bit pattern for edges c, b, and a will be 0,0,1, indicating that faces having the configuration shown in FIG. 12B will be displayed in place of the original face. Analogously, if the "used" split vertex resides only on side c (FIG. 12D), the bit pattern for edges c, b, and a will be 1,0,0, indicating that faces having the configuration shown in FIG. 12D will be displayed in place of the original face.

If two split vertices are "used," the locations of the patch edges created will depend on the locations of the "used" split vertices. For example, if the "used" split vertices reside on edges a and b (FIG. 12E), the corresponding bit pattern for edges c, b, and a will be 0,1,1, indicating that faces having the configuration shown in FIG. 12E will be displayed in place of the original face. Likewise, if the "used" split vertices reside on sides b and c (FIG. 12G), the bit pattern for edges c, b, and a will be 1,1,0, indicating that faces having the configuration shown in FIG. 12G will be displayed in place of the original face.

Figure 12B:
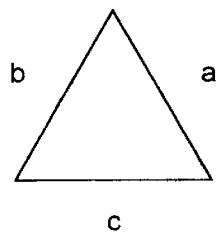
Figure 12B:
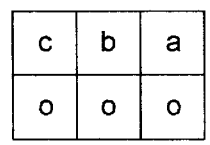
Figure 12B:
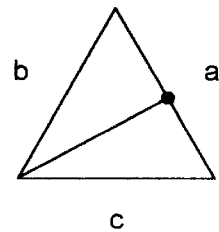
Figure 12C:
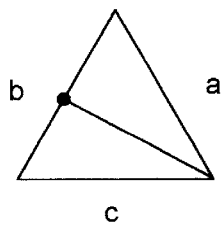
Figure 12D:
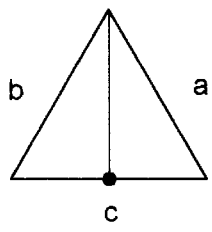
Figure 12E:
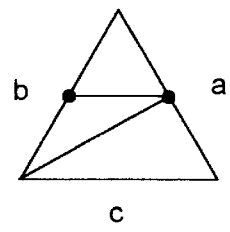
Figure 12F:
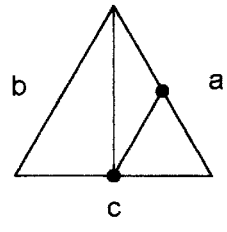
Figure 12G:
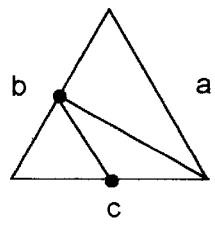
Figure 12H:
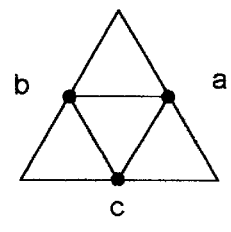

In the worst case, "used" split vertices may be detected on all three sides a, b, and c (FIG. 12H). In this case, the bit pattern for edges c, b, and a will be 1,1,1, indicating that faces having the configuration shown in FIG. 12H will be displayed in place of the original face. As can be appreciated by those skilled in the art, the unique bit patterns that identify the locations where the split vertices occur in a face may also be employed to identify the patch edge configurations that are required to eliminate the existence of T-vertices.

Referring back to FIG. 11, the examination of each split vertex to determined whether it has been "used" takes place in step 604. Responsive to the determination of step 604, the bit pattern is then set in step 606. In step 608, the face(s) are actually drawn on the display screen. The actual face(s) to be drawn depend on the number and locations of the patch edges. In one embodiment, the actual face(s) to be drawn are determined based on the configuration data represented by the aforementioned bit pattern for edges c, b, and a. Note that the face(s) drawn in step 608 may differ from the face examined in step 604 due to the addition of patch edges (such as patch edge 520 of FIG. 10, which splits face 502 into two sub-faces).

In one embodiment, the normal associated with a vertex is defined by the first face that employs that vertex for shading. This same normal is also used by other faces sharing the same vertex to facilitate smooth shading even though the normals associated with these other faces at this vertex may differ from the first normal. With reference to FIG. 10, assume that face 502 is the first face of FIG. 10 to be put into the display list. The normal at vertex 514 is calculated and shown in FIG. 10 as normal 522. When face 504, which shares vertex 514, is subsequently put into the display list to be displayed, the normal associated with face 504 at this vertex 514 is assigned the value of normal 522 (although it actually should have the value of normal 526 of FIG. 10 given its orientation). As can be appreciated by those skilled in the art, the technique advantageously allows the normal associated with a vertex to be fixed by the normal of the first face that is drawn using that vertex. Since the same normal is used at a vertex for all faces that share that vertex, smooth shading among adjacent faces, e.g., between faces 502 and 504 across line 501, is efficiently achieved.

In accordance with another aspect of the present invention, the normal associated with a vertex at any given time is interpolated between two normal values for the face at its level of detail: a beginning value and an end value. These normal values are preferably supplied as part of the input data set and are associated with a given face at a give level of detail. The normal associated with a vertex at any given point in time is interpolated, preferably in a linear manner, according to the degree to which the face end vertices have morphed. As can be appreciated by those skilled in the art, the face shading process during morphing can be made substantially more efficient when the normals are derived simply by interpolating between supplied normals instead of being recalculated for every frame.

While this invention has been described in terms of several preferred embodiments, there are alterations, permutations, and equivalents which fall within the scope of this invention. Further, it should be borne in mind that there are many alternative ways of implementing the methods and apparatuses of the present invention.

What is claimed is:

1. A computer-implemented method for managing levels of detail of a first plurality of polygons representative of a portion of an image to be displayed on a computer display terminal, said portion representing a field of view of said image, said levels of detail being determined responsive to predefined display criteria, comprising:

loading said first plurality of said polygons into a face queue;

examining, from a top of said face queue, a first polygon of said first plurality of polygons, including placing said first polygon into a display list if said first polygon satisfies said predefined display criteria, and substituting a second polygon back into said face queue at a bottom of said face queue if said first polygon fails to satisfy said predefined display criteria, said second polygon representing a child polygon of said first polygon, said second polygon having a higher level of detail than said first polygon, wherein, at any given point in time, polygons in said face queue and said display list represent polygons employed to represent said portion of said image.

2. The method of claim 1 wherein said predefined display criteria include a threshold criterion, said first polygon satisfying said threshold criterion if said first polygon is sufficiently detailed given its distance from said eye point.

3. The method of claim 2 wherein said threshold criterion is satisfied if a distance between all split vertices of said first polygon to said eyepoint is greater than a threshold value, said threshold value being associated with a level of detail of said first polygon.

4. The method of claim 1 wherein said predefined display criteria include a field of view test, said first polygon satisfying said field of view test if said first polygon is within said field of view of said image in a next frame to be displayed.

5. The method of claim 1 wherein said predefined display criteria include a morphing test, said first polygon satisfying said morphing test if end vertices of said first polygon are not fully morphed.

6. The method of claim 1 wherein said polygons in said face queue and said display list are displayed upon an expiration of a predefined time period irrespective of whether all polygons within said face queue have been examined.

7. The method of claim 6 wherein said predefined time period represents a time period determined by a predefined frame rate required to display said portion of said image in said field of view.

8. The method of claim 1 wherein said polygons in said face queue and said display list are displayed when all polygons in said face queue have been examined and placed into said display list.

9. The method of claim 1 wherein said first polygon and said second polygon are computed and stored in advance, thereby eliminating a need to compute said second polygon during said managing said levels of detail.

10. A computer-implemented method for modeling a three-dimensional image with polygons having different levels of detail, comprising:

initially modeling said three-dimensional image with a first plurality of polygons at a first level of detail, said first level of detail representing the coarsest level of detail available for modeling said three-dimensional image, said first plurality of polygons being provided as part of an input data set;

comparing a distance between a first polygon of said first plurality of polygons and an eye point to a predefined threshold distance value associated with a level of detail of said first polygon; and if said distance is less than said predefined threshold distance value, substituting in a second plurality of polygons for said first polygon, said second plurality of polygons being at a second level of detail higher than said first level of detail, said second plurality of polygons being computed in advance prior to a commencement of said initial modeling step and provided as part of said input data set.

11. The method of claim 10 further comprising the step of loading said first plurality of polygons into a FIFO queue to facilitate said comparing step.

12. The method of claim 11 wherein said first polygon is taken from a top of said FIFO queue, said second plurality of polygons being loaded into a bottom of said FIFO queue for further comparison if said distance is less than said predefined threshold distance value.

13. The method of claim 11 further comprising the step of removing said parent polygon from said FIFO queue if said distance is greater than said predefined threshold distance value.

14. The method of claim 10 further comprising:

placing said first polygon into a display list for display on a computer display terminal if said distance is greater than said predefined threshold distance value.

15. The method of claim 14 further comprising the step of loading said first plurality of polygons into a FIFO queue to facilitate said comparing step, wherein polygons in said FIFO queues and said display list represent polygons employed for displaying said three dimensional image at any given point in time.

16. A computer readable medium containing computer-readable instructions for managing levels of detail of a first plurality of polygons representative of a portion of an image to be displayed on a computer display terminal, said portion representing a field of view of said image, said levels of detail being determined responsive to predefined display criteria, said computer readable instructions including instructions for:

loading said first plurality of said polygons into a face queue;

examining, from a top of said face queue, a first polygon of said first plurality of polygons, including placing said first polygon into a display list if said first polygon satisfies said predefined display criteria, and substituting a second polygon back into said face queue at a bottom of said face queue if said first polygon fails to satisfy said predefined display criteria, said second polygon representing a child polygon of said first polygon, said second polygon having a higher level of detail than said first polygon, wherein, at any given point in time, polygons in said face queue and said display list represent polygons employed to represent said portion of said image.

17. The computer readable medium of claim 16 wherein said predefined display criteria include a threshold criterion, said first polygon satisfying said threshold criterion if said first polygon is sufficiently detailed given its distance from said eye point.

18. The computer readable medium of claim 17 wherein said threshold criterion is satisfied if a distance between all split vertices of said first polygon to said eyepoint is greater than a threshold value, said threshold value being associated with a level of detail of said first polygon.

19. The computer readable medium of claim 16 wherein said predefined display criteria include a field of view test, said first polygon satisfying said field of view test if said first polygon is within said field of view of said image in a next frame to be displayed.

20. The computer readable medium of claim 16 wherein said predefined display criteria include a morphing test, said first polygon satisfying said morphing test if end vertices of said first polygon are not fully morphed.

21. The computer readable medium of claim 16 wherein said polygons in said face queue and said display list are displayed upon an expiration of a predefined time period irrespective of whether all polygons within said face queue have been examined.

22. The computer readable medium of claim 21 wherein said predefined time period represents a time period determined by a predefined frame rate required to display said portion of said image in said field of view.

23. The computer readable medium of claim 16 wherein said polygons in said face queue and said display list are displayed when all polygons in said face queue have been examined and placed into said display list.

24. The computer readable medium of claim 16 wherein different portions of said image representing different fields of view are simultaneously displayed on said computer display terminal.

25. The computer readable medium of claim 16 wherein said first polygon and said second polygon are computed and stored in advance, thereby eliminating a need to compute said second polygon during said managing said levels of detail.

* * * * *